United States Patent
Yu et al.

(10) Patent No.: US 10,379,977 B2
(45) Date of Patent: Aug. 13, 2019

(54) DATA MANAGEMENT METHOD, NODE, AND SYSTEM FOR DATABASE CLUSTER

(71) Applicant: Huawei Technologies Co., Ltd., Shenzhen (CN)

(72) Inventors: Wei Yu, Beijing (CN); Huijun Liu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 15/365,728

(22) Filed: Nov. 30, 2016

(65) Prior Publication Data
US 2017/0083419 A1 Mar. 23, 2017

Related U.S. Application Data

(63) Continuation of application No. PCT/CN2014/092140, filed on Nov. 25, 2014.

(30) Foreign Application Priority Data

May 30, 2014 (CN) .......................... 2014 1 0242052

(51) Int. Cl.
*G06F 11/00* (2006.01)
*G06F 11/20* (2006.01)
(Continued)

(52) U.S. Cl.
CPC .......... *G06F 11/2094* (2013.01); *G06F 3/064* (2013.01); *G06F 3/065* (2013.01);
(Continued)

(58) Field of Classification Search
CPC .............. G06F 11/2094; G06F 11/202; G06F 11/2023; G06F 11/2046; G06F 11/1471;
(Continued)

(56) References Cited

U.S. PATENT DOCUMENTS 8,407,403 B2 3/2013 Prabhakaran et al.
9,026,746 B2 5/2015 Tanaka
(Continued)

FOREIGN PATENT DOCUMENTS

CN 102236623 A 11/2011
CN 102521389 A 6/2012
(Continued)

*Primary Examiner* — Anthony J Amoroso
(74) *Attorney, Agent, or Firm* — Leydig, Voit & Mayer, Ltd.

(57) ABSTRACT

The present disclosure provides a data management method for a database cluster including a first dual port SSD, a second dual port SSD, a first node, a second node, and a third node, where the first dual port SSD is connected to the first node and the second node, and the second dual port SSD is connected to the second node and the third node; and the first node writes a transaction log to the first dual port SSD, when the first node crashes, the second node acquires the transaction log from the first dual port SSD, and operates, according to the transaction log, data that is stored in the first node, so that, the second node or the third node can use a dual port SSD to read log information of the crashed node, and replace the first node to provide a service externally.

18 Claims, 4 Drawing Sheets

(51) Int. Cl.
*G06F 16/11* (2019.01)
*G06F 16/17* (2019.01)
*G06F 3/06* (2006.01)
*G06F 16/00* (2019.01)
*G06F 11/14* (2006.01)

(52) U.S. Cl.
CPC ............ *G06F 3/067* (2013.01); *G06F 3/0619* (2013.01); *G06F 3/0688* (2013.01); *G06F 11/202* (2013.01); *G06F 11/2023* (2013.01); *G06F 11/2046* (2013.01); *G06F 16/00* (2019.01); *G06F 16/113* (2019.01); *G06F 16/1734* (2019.01); *G06F 11/1471* (2013.01); *G06F 2201/80* (2013.01); *G06F 2201/805* (2013.01); *G06F 2201/82* (2013.01)

(58) Field of Classification Search
CPC ............... G06F 17/30; G06F 17/30073; G06F 17/30144; G06F 2201/80; G06F 2201/805; G06F 2201/82; G06F 9/4405; G06F 16/00; G06F 16/113; G06F 16/1734; G06F 16/11; G06F 16/128; G06F 3/0619; G06F 3/064; G06F 3/065; G06F 3/067; G06F 3/0688
See application file for complete search history.

(56) References Cited

U.S. PATENT DOCUMENTS

| | | |
|---|---|---|
| 2004/0153749 A1 | 8/2004 | Schwarm et al. |
| 2005/0187891 A1 | 8/2005 | Johnson et al. |
| 2007/0130220 A1 | 6/2007 | Baba et al. |
| 2008/0235245 A1 | 9/2008 | Huras et al. |
| 2010/0059100 A1 | 3/2010 | Kim et al. |
| 2011/0060724 A1* | 3/2011 | Chan .................... G06F 11/1469 707/683 |
| 2011/0113279 A1* | 5/2011 | Cagno ................ G06F 11/2089 714/5.11 |
| 2012/0036161 A1 | 2/2012 | Lacapra et al. |
| 2012/0254120 A1 | 10/2012 | Fang et al. |
| 2013/0013569 A1 | 1/2013 | Pafumi et al. |
| 2013/0046942 A1 | 2/2013 | Namba et al. |
| 2015/0143031 A1* | 5/2015 | Lu .......................... G06F 13/28 711/103 |
| 2015/0254264 A1 | 9/2015 | Yu et al. |

FOREIGN PATENT DOCUMENTS

| | | | |
|---|---|---|---|
| CN | 103365987 A | 10/2013 | |
| CN | 103729442 A | 4/2014 | |
| CN | 103984768 A | 8/2014 | |
| JP | H0991183 A | 4/1997 | |
| JP | H09204341 A | 8/1997 | |
| JP | 2005078285 A | 3/2005 | |
| JP | 2007157150 A | 6/2007 | |
| JP | 2007157150 A * | 6/2007 | ........... G06F 9/4405 |
| JP | 2008191705 A | 8/2008 | |
| JP | 2009520253 A | 5/2009 | |
| JP | 2013041403 A | 2/2013 | |
| JP | 2013186557 A | 9/2013 | |
| RU | 2473981 C2 | 1/2013 | |
| WO | 2004097810 A1 | 11/2004 | |
| WO | 2013170731 A1 | 11/2013 | |

* cited by examiner

A first node writes a transaction log to a first dual port SSD, so that in a case in which the first node crashes, a second node acquires the transaction log from the first dual port SSD, and the second node runs, according to the transaction log, data that is used before the first node crashes; or the first node writes a transaction log to the first dual port SSD, so that in a case in which the first node crashes, after the second node acquires the transaction log from the first dual port SSD, the second node sends the transaction log to a third node, and the third node runs data that is used before the first node crashes, where data transmission can be performed between the third node, the first node, and the second node

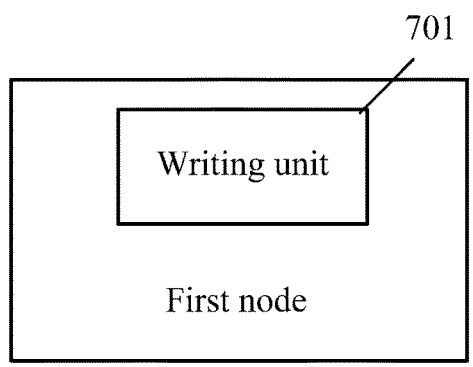

FIG. 7

DATA MANAGEMENT METHOD, NODE, AND SYSTEM FOR DATABASE CLUSTER

CROSS-REFERENCE TO RELATED APPLICATIONS

This application is a continuation of International Application No. PCT/CN2014/092140, filed on Nov. 25, 2014, which claims priority to Chinese Patent Application No. 201410242052.X, filed on May 30, 2014. The disclosures of the aforementioned applications are hereby incorporated by reference in their entireties.

TECHNICAL FIELD

The present disclosure relates to the field of databases, and in particular, to a data management method, node, and system for a database cluster.

BACKGROUND

All nodes in a database cluster are connected to a shared disk array, and the shared disk array stores data of all the nodes. If a node in the database cluster crashes, data updated in the node cannot be used for a period of time, causing some services to be affected. A general solution is to update a log of the node to the shared disk array, and when the node crashes, another node reads the log of the node for performing recovery; if another node cannot read the log of the node, the data in the node cannot be restored until the node is restarted, and subsequently, a service is provided externally; such a process is very time-consuming, affecting services. In addition, when log information is updated to the shared disk array, performance of a cluster system can also be greatly affected due to a large quantity of synchronized logs.

SUMMARY

Embodiments of the present disclosure provide a data management method, node, and system for a database cluster, so as to solve a problem that a service is affected due to a time-consuming recovery process of a node after the node crashes.

According to a first aspect, a data management method for a database cluster is provided, where the database cluster includes a first dual port solid state disk SSD, a second dual port solid state disk SSD, a first node, a second node, and a third node, where the first dual port SSD is connected to the first node and the second node, and the second dual port SSD is connected to the second node and the third node; and the method includes:

writing, by the first node, a transaction log to the first dual port SSD, so that in a case in which the first node crashes, the second node acquires the transaction log from the first dual port SSD, and the second node operates, according to the transaction log, data that is stored in the first node before the first node crashes; or writing, by the first node, a transaction log to the first dual port SSD, so that in a case in which the first node crashes, after the second node acquires the transaction log from the first dual port SSD, the second node sends the transaction log to the third node, and the third node operates data that is stored in the first node before the first node crashes, where the third node, the first node, and the second node being capable of data transmission with each other.

In a first possible implementation manner of the first aspect, the method further includes:

acquiring, by the first node in a preset period, a transaction log that is after a checkpoint of the first dual port SSD, and archiving, into a shared disk array, the transaction log that is after the checkpoint.

With reference to the first aspect or the first possible implementation manner of the first aspect, in a second possible implementation manner of the first aspect, the method further includes:

in a case in which both the first node and the second node are database instances, directly performing, by the first node, data transmission with the second node by using the first dual port SSD.

With reference to the second possible implementation manner of the first aspect, in a third possible implementation manner of the first aspect, at least one port in the first dual port SSD is a PCIE port; and at least one port in the second dual port SSD is a PCIE port.

With reference to the first aspect or any one of the first to third possible implementation manner of the first aspect, in a fourth possible implementation manner of the first aspect, the method further includes:

starting, by the second node, another database process to operate the data that is stored in the first node before the first node crashes, where the another database process is independent of an original database process in the second node.

With reference to the first aspect or any one of the first to third possible implementation manner of the first aspect, in a fifth possible implementation manner of the first aspect, the method further includes:

starting, by the third node, another database process to operate the data that is stored in the first node before the first node crashes, where the another database process is independent of an original database process in the third node.

According to a second aspect, a first node is provided, where a database cluster includes a first dual port solid state disk SSD, a second dual port solid state disk SSD, the first node, a second node, and a third node, where the first dual port SSD is connected to the first node and the second node, and the second dual port SSD is connected to the second node and the third node; and the first node includes:

a writing unit, configured to write a transaction log to the first dual port SSD, so that in a case in which the first node crashes, the second node acquires the transaction log from the first dual port SSD, and the second node operates, according to the transaction log, data that is stored in the first node before the first node crashes; or write a transaction log to the first dual port SSD, so that in a case in which the first node crashes, after the second node acquires the transaction log from the first dual port SSD, the second node sends the transaction log to the third node, and the third node operates data that is stored in the first node before the first node crashes, where the third node, the first node, and the second node being capable of data transmission with each other.

In a first possible implementation manner of the second aspect, the first node further includes:

an acquiring unit, configured to acquire, in a preset period, a transaction log that is after a checkpoint of the first dual port SSD; and an archiving unit, configured to archive, into a shared disk array, the transaction log that is after the checkpoint.

With reference to the second aspect or the first possible implementation manner of the second aspect, in a second possible implementation manner of the second aspect, the first node further includes:

a transmission unit, configured to: in a case in which both the first node and the second node are database instances, directly perform data transmission with the second node by using the first dual port SSD.

With reference to the second possible implementation manner of the second aspect, in a third possible implementation manner of the second aspect, at least one port in the first dual port SSD is a PCIE port; and at least one port in the second dual port SSD is a PCIE port.

With reference to the second aspect or any one of the first to third possible implementation manner of the second aspect, in a fourth possible implementation manner of the second aspect, the first node further includes:

a start unit, configured to start another database process to operate the data that is stored in the first node before the first node crashes, where the another database process is independent of an original database process in the second node.

With reference to the second aspect or any one of the first to third possible implementation manner of the second aspect, in a fifth possible implementation manner of the second aspect, the first node further includes:

a start unit, configured to start another database process to operate the data that is stored in the first node before the first node crashes, where the another database process is independent of an original database process in the third node.

According to a third aspect, a data management system for a database cluster is provided, where the database cluster includes a first dual port solid state disk SSD, a second dual port solid state disk SSD, a first node, a second node, and a third node, where the first dual port SSD is connected to the first node and the second node, and the second dual port SSD is connected to the second node and the third node;

the first node is configured to write a transaction log to the first dual port SSD; and the second node is configured to: in a case in which the first node crashes, acquire the transaction log from the first dual port SSD, and operate, according to the transaction log, data that is stored in the first node before the first node crashes; or in a case in which the first node crashes, acquire the transaction log from the first dual port SSD, send the transaction log to the third node, and the third node operates, according to the transaction log, data that is stored in the first node before the first node crashes, where the third node, the first node, and the second node being capable of data transmission with each other.

In a first possible implementation manner of the third aspect, the first node further includes:

an acquiring unit, configured to acquire, in a preset period, a transaction log that is after a checkpoint of the first dual port SSD; and an archiving unit, configured to archive, into a shared disk array, the transaction log that is after the checkpoint.

With reference to the third aspect or the first possible implementation manner of the third aspect, in a second possible implementation manner of the third aspect, the first node further includes:

a transmission unit, configured to: in a case in which both the first node and the second node are database instances, directly perform data transmission with the second node by using the first dual port SSD.

With reference to the second possible implementation manner of the third aspect, in a third possible implementation manner of the third aspect, at least one port in the first dual port SSD is a PCIE port; and at least one port in the second dual port SSD is a PCIE port.

With reference to the third aspect or any one of the first to third possible implementation manner of the third aspect, in a fourth possible implementation manner of the third aspect, the first node further includes:

a start unit, configured to start another database process to operate the data that is stored in the first node before the first node crashes, where the another database process is independent of an original database process in the second node.

With reference to the third aspect or any one of the first to third possible implementation manner of the third aspect, in a fifth possible implementation manner of the third aspect, a start unit is configured to start another database process to operate the data that is stored in the first node before the first node crashes, where the another database process is independent of an original database process in the third node.

The embodiments of the present disclosure provide a data management method for a database cluster, where the database cluster includes a first dual port solid state disk SSD, a second dual port solid state disk SSD, a first node, a second node, and a third node, where the first dual port SSD is connected to the first node and the second node, and the second dual port SSD is connected to the second node and the third node; and the first node writes a transaction log to the first dual port SSD, so that in a case in which the first node crashes, the second node acquires the transaction log from the first dual port SSD, and the second node operates, according to the transaction log, data that is stored in the first node before the first node crashes; or the first node writes a transaction log to the first dual port SSD, so that in a case in which the first node crashes, after the second node acquires the transaction log from the first dual port SSD, the second node sends the transaction log to the third node, and the third node operates data that is stored in the first node before the first node crashes, where data transmission can be performed between the third node, the first node, and the second node, so that when the first node, the second node or the third node can use a dual port SSD to read log information of the crashed node, and after performing recovery, replace the first node to provide a service externally, thereby improving a recovery speed of the cluster, and improving system availability.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 6 is a flowchart of a data management method for a database cluster according to an embodiment of the present disclosure;

FIG. 7 is a structural diagram of apparatuses of a first node according to an embodiment of the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are merely some rather than all of the embodiments of the present disclosure.

Figure 1:
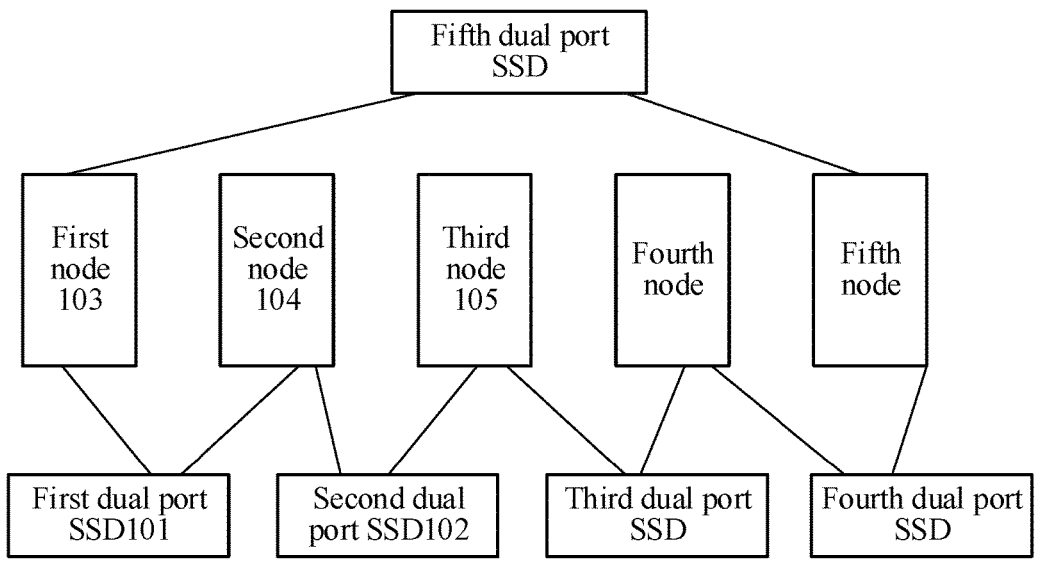
FIG. 1 is a structural diagram of a data management system for a database cluster according to an embodiment of the present disclosure.

Referring to FIG. 1, FIG. 1 is a structural diagram of a data management system for a database cluster according to an embodiment of the present disclosure. As shown in FIG. 1, the system includes:

a first dual port solid state disk (SSD) 101, a second dual port SSD 102, a first node 103, a second node 104, and a third node 105, where the first dual port SSD 101 is connected to the first node 103 and the second node 104, the second dual port SSD 102 is connected to the second node 104 and the third node 105, and the second node 104 is separately connected to the first dual port SSD 101 and the second dual port SSD 102;

the first node 103 is configured to write a transaction log (transaction log) to the first dual port SSD 101; and the second node 104 is configured to: in a case in which the first node 103 crashes, acquire the transaction log from the first dual port SSD 101, and operate, according to the transaction log, data that is stored in the first node before the first node 103 crashes; or in a case in which the first node 103 crashes, acquire the transaction log from the first dual port SSD 101, send the transaction log to the third node 105, and the third node 105 operates, according to the transaction log, data that is stored in the first node before the first node 103 crashes, where data transmission can be performed among the third node 105, the first node 103, and the second node 104.

The first node 103 further includes:

an acquiring unit, configured to acquire, in a preset period, a transaction log that is after a checkpoint of the first dual port SSD; and an archiving unit, configured to archive, into a shared disk array, the transaction log that is after the checkpoint.

Figure 2:
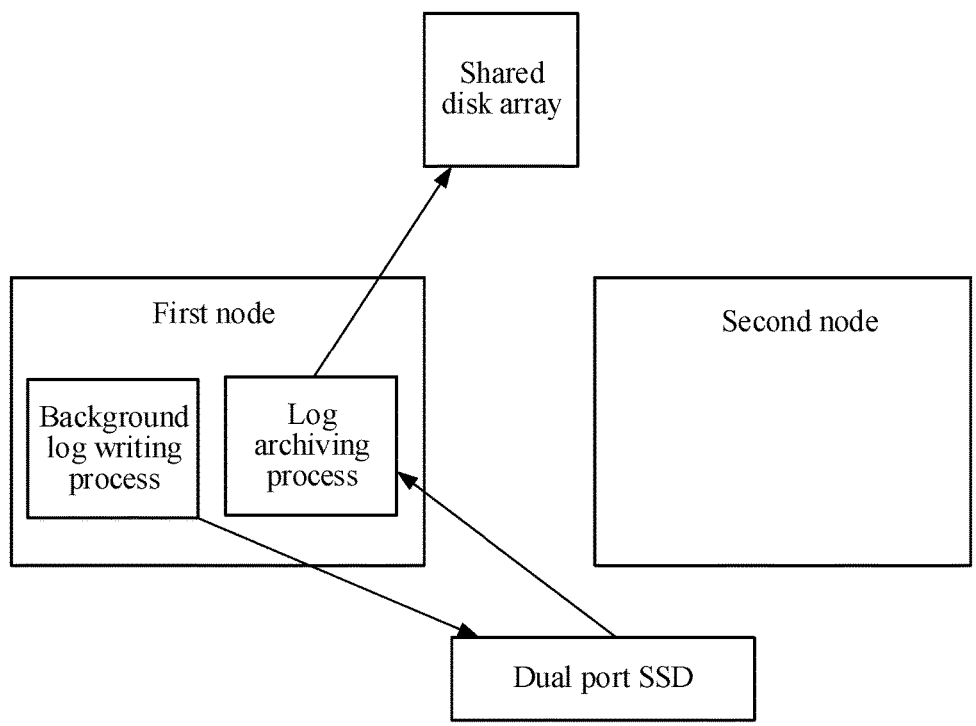
FIG. 2 is a schematic diagram of a structure of data management for a database cluster according to an embodiment of the present disclosure.
Figure 3:
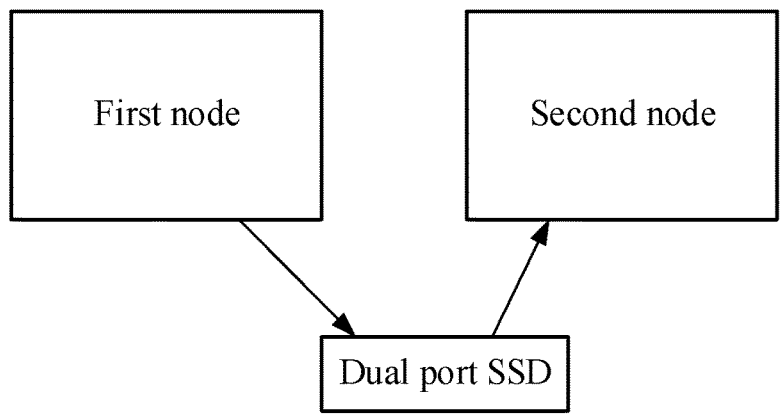
FIG. 3 is a schematic diagram of a structure of data management for a database cluster according to an embodiment of the present disclosure.
Figure 4:
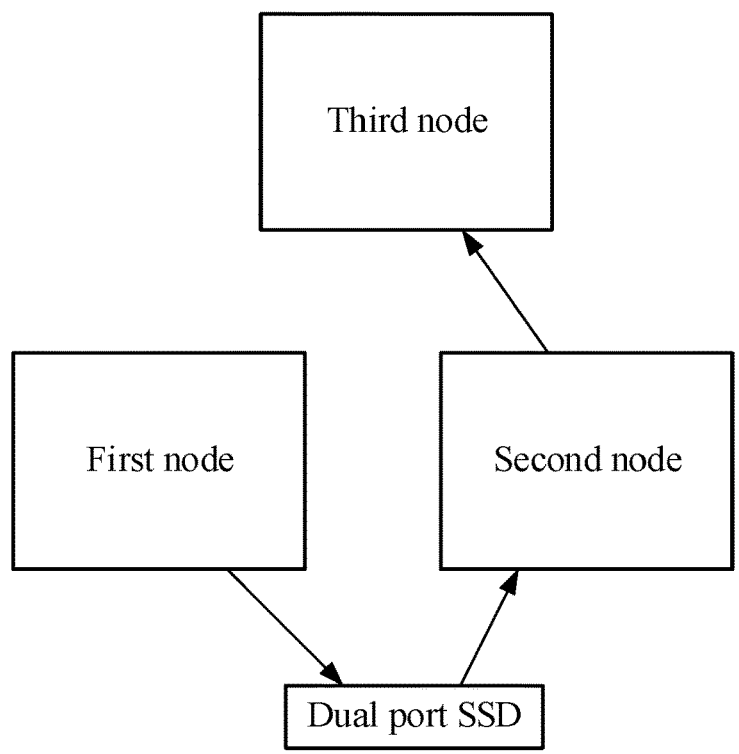
FIG. 4 is a schematic diagram of a structure of data management for a database cluster according to an embodiment of the present disclosure.

Specifically, referring to FIG. 2 to FIG. 4, FIG. 2 to FIG. 4 are schematic diagrams of structures of data management for a database cluster according to embodiments of the present disclosure. As shown in FIG. 2, a first node generates a transaction log, which is written to an SSD by a background log writing process; the first node regularly reads, from the SSD, a log that is after a checkpoint, and a log archiving process of the first node archives, into a shared disk array, the log that is after the checkpoint; and after recovering by reading the log of the first node by using a first dual port SSD, a second node replaces the first node to work.

As shown in FIG. 3, after the first node crashes, the second node reads the log of the first node from the first dual port SSD, the second node starts a new database process for performing recovery, and after performing recovery, the second node externally provides a service, and the second node reads the log of the first node by using the first dual port SSD, and transmits the log to another node for performing recovery.

As shown in FIG. 4, after the first node crashes, the second node reads the log of the first node from the SSD, the second node transmits the log to a third node, and after acquiring data of the first node and after performing a recovery operation, the third node externally provides a service.

The first node further includes:

a transmission unit, configured to: in a case in which both the first node and the second node are database instances, directly perform data transmission with the second node by using the first dual port SSD.

Figure 5:
FIG. 5 is a schematic diagram of a data management method for a database cluster according to an embodiment of the present disclosure.

Specifically, as shown in FIG. 5, FIG. 5 is a schematic diagram of a data management method for a database cluster according to an embodiment of the present disclosure.

As shown in FIG. 5, in a case in which both a first node and a second node are database instances, data transmission may be directly performed by using a dual port, so as to avoid a problem of a low data transmission speed caused by a case such as network congestion.

Optionally, at least one port in the first dual port SSD is a PCIE port; and at least one port in the second dual port SSD is a PCIE port.

Optionally, the first node further includes:

a start unit, configured to start another database process to operate data that is stored in the first node before the first node crashes, where the another database process is independent of an original database process in the second node.

Optionally, the first node further includes:

a start unit is configured to start another database process to operate data that is stored in the first node before the first node crashes, where the another database process is independent of an original database process in a third node.

This embodiment of the present disclosure provides a data management system for a database cluster, where the database cluster includes a first dual port SSD, a second dual port SSD, a first node, a second node, and a third node, where the first dual port SSD is connected to the first node and the second node, and the second dual port SSD is connected to the second node and the third node; and the first node writes a transaction log to the first dual port SSD, so that in a case in which the first node crashes, the second node acquires the transaction log from the first dual port SSD, and the second node operates, according to the transaction log, data that is stored in the first node before the first node crashes; or the first node writes a transaction log to the first dual port SSD, so that in a case in which the first node crashes, after the second node acquires the transaction log from the first dual port SSD, the second node sends the transaction log to the third node, and the third node operates data that is stored in the first node before the first node crashes, where the third node, the first node, and the second node being capable of data transmission with each other, so that when the first node crashes, the second node or the third node can use a dual port SSD to read log information of the crashed node, and after performing recovery, replace the first node to provide a service externally, thereby improving a recovery speed of the cluster, and improving system availability.

Referring to FIG. 6, FIG. 6 is a flowchart of a data management method for a database cluster according to an embodiment of the present disclosure. A first dual port SSD is connected to a first node and a second node, a second dual port SSD is connected to the second node and a third node, and the second node is separately connected to the first dual port SSD and the second dual port SSD. The method includes:

Step 601: The first node writes a transaction log to the first dual port SSD, so that in a case in which the first node crashes, the second node acquires the transaction log from the first dual port SSD, and the second node operates, according to the transaction log, data that is stored in the first node before the first node crashes; or the first node writes a transaction log to the first dual port SSD, so that in a case in which the first node crashes, after the second node acquires the transaction log from the first dual port SSD, the second node sends the transaction log to the third node, and the third node operates data that is stored in the first node before the first node crashes, where the third node, the first node, and the second node being capable of data transmission with each other.

The method further includes:

acquiring, by the first node in a preset period, a transaction log that is after a checkpoint of the first dual port SSD, and archiving, into a shared disk array, the transaction log that is after the checkpoint.

The method further includes:

in a case in which both the first node and the second node are database instances, directly performing, by the first node, data transmission with the second node by using the first dual port SSD.

At least one port in the first dual port SSD is a PCIE port; and at least one port in the second dual port SSD is a PCIE port.

For details, refer to the descriptions of FIG. 2 to FIG. 4.

The method further includes:

starting, by the second node, another database process to operate the data that is stored in the first node before the first node crashes, where the another database process is independent of an original database process in the second node.

The method further includes:

starting, by the third node, another database process to operate the data that is stored in the first node before the first node crashes, where the another database process is independent of an original database process in the third node.

For details, refer to the description of FIG. 5.

This embodiment of the present disclosure provides a data management method for a database cluster, where the database cluster includes a first dual port solid state disk SSD, a second dual port SSD, a first node, a second node, and a third node, where the first dual port SSD is connected to the first node and the second node, and the second dual port SSD is connected to the second node and the third node; and the first node writes a transaction log to the first dual port SSD, so that in a case in which the first node crashes, the second node acquires the transaction log from the first dual port SSD, and the second node operates, according to the transaction log, data that is stored in the first node before the first node crashes; or the first node writes a transaction log to the first dual port SSD, so that in a case in which the first node crashes, after the second node acquires the transaction log from the first dual port SSD, the second node sends the transaction log to the third node, and the third node operates data that is stored in the first node before the first node crashes, where the third node, the first node, and the second node being capable of data transmission with each other, so that when the first node crashes, the second node or the third node can use a dual port SSD to read log information of the crashed node, and after performing recovery, replace the first node to provide a service externally, thereby improving a recovery speed of the cluster, and improving system availability.

Referring to FIG. 7, FIG. 7 is a structural diagram of apparatuses of a first node according to an embodiment of the present disclosure. As shown in FIG. 7, a database cluster includes a first dual port solid state disk SSD, a second dual port SSD, a first node, a second node, and a third node, where the first dual port SSD is connected to the first node and the second node, and the second dual port SSD is connected to the second node and the third node; and the first node includes:

a writing unit 701, configured to write a transaction log to the first dual port SSD, so that in a case in which the first node crashes, the second node acquires the transaction log from the first dual port SSD, and the second node operates, according to the transaction log, data that is stored in the first node before the first node crashes; or write a transaction log to the first dual port SSD, so that in a case in which the first node crashes, after the second node acquires the transaction log from the first dual port SSD, the second node sends the transaction log to the third node, and the third node operates data that is stored in the first node before the first node crashes, where the third node, the first node, and the second node being capable of data transmission with each other.

Optionally, the first node further includes:

an acquiring unit, configured to acquire, in a preset period, a transaction log that is after a checkpoint of the first dual port SSD; and an archiving unit, configured to archive, into a shared disk array, the transaction log that is after the checkpoint.

Optionally, the first node further includes:

a transmission unit, configured to: in a case in which both the first node and the second node are database instances, directly perform data transmission with the second node by using the first dual port SSD.

At least one port in the first dual port SSD is a PCIE port; and at least one port in the second dual port SSD is a PCIE port.

Optionally, the first node further includes:

a start unit, configured to start another database process to operate the data that is stored in the first node before the first node crashes, where the another database process is independent of an original database process in the second node.

Optionally, the first node further includes:

a start unit is configured to start another database process to operate the data that is stored in the first node before the first node crashes, where the another database process is independent of an original database process in the third node.

For details, refer to the descriptions of FIG. 2 to FIG. 5.

This embodiment of the present disclosure provides a first node, where the first node writes a transaction log to a first dual port SSD, so that in a case in which the first node crashes, a second node acquires the transaction log from the first dual port SSD, and the second node operates, according to the transaction log, data that is stored in the first node before the first node crashes; or the first node writes a transaction log to the first dual port SSD, so that in a case in which the first node crashes, after the second node acquires the transaction log from the first dual port SSD, the second node sends the transaction log to a third node, and the third node operates data that is stored in the first node before the first node crashes, where the third node, the first node, and the second node being capable of data transmission with each other, so that when the first node crashes, the second node or the third node can use a dual port SSD to read log information of the crashed node, and after performing recovery, replace the first node to provide a service externally, thereby improving a recovery speed of the cluster, and improving system availability.

Figure 8:
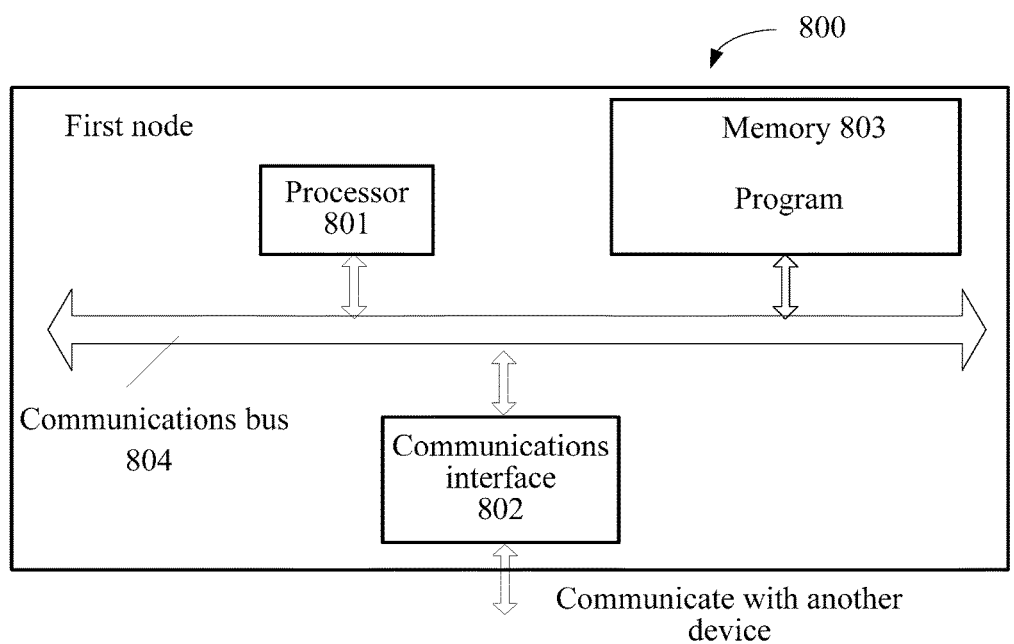
FIG. 8 is a structural diagram of apparatuses of a first node according to an embodiment of the present disclosure.

FIG. 8 is a structural diagram of apparatuses of a first node according to an embodiment of the present disclosure. Referring to FIG. 8, FIG. 8 shows a first node 800 according to an embodiment of the present disclosure, and a specific embodiment of the present disclosure does not limit specific implementation of the first node. The first node 800 includes:

a processor (processor) 801, a communications interface (Communications Interface) 802, a memory (memory) 803, and a bus 804.

The processor 801, the communications interface 802, and the memory 803 complete mutual communication by using the bus 804.

The communications interface 802 is configured to communicate with another device; and the processor 801 is configured to perform a program.

Specifically, the program may include program code, and the program code includes a computer operation instruction.

The processor 801 may be a central processing unit (CPU), or an application-specific integrated circuit Application-Specific Integrated Circuit (ASIC), or is configured as one or more integrated circuits for implementing the embodiments of the present disclosure.

The memory 803 is configured to store a program. The memory 803 may be a volatile memory (volatile memory), such as a random access memory (RAM), or a non-volatile memory (non-volatile memory), such as a read-only memory (read-only memory, ROM), a flash memory (flash memory), a hard disk drive (hard disk drive, HDD), or a solid state disk SSD). The processor 801 performs the following method according to a program instruction stored in the memory 803:

writing, by the first node, a transaction log to a first dual port SSD, so that in a case in which the first node crashes, a second node acquires the transaction log from the first dual port SSD, and the second node operates, according to the transaction log, data that is stored in the first node before the first node crashes; or writing, by the first node, a transaction log to a first dual port SSD, so that in a case in which the first node crashes, after a second node acquires the transaction log from the first dual port SSD, the second node sends the transaction log to a third node, and the third node operates data that is stored in the first node before the first node crashes, where the third node, the first node, and the second node being capable of data transmission with each other.

The method further includes:

acquiring, by the first node in a preset period, a transaction log that is after a checkpoint of the first dual port SSD, and archiving, into a shared disk array, the transaction log that is after the checkpoint.

The method further includes:

in a case in which both the first node and the second node are database instances, directly performing, by the first node, data transmission with the second node by using the first dual port SSD.

At least one port in the first dual port SSD is a PCIE port; and at least one port in the second dual port SSD is a PCIE port.

The method further includes:

starting, by the second node, another database process to operate the data that is stored in the first node before the first node crashes, where the another database process is independent of an original database process in the second node.

The method further includes:

starting, by the third node, another database process to operate the data that is stored in the first node before the first node crashes, where the another database process is independent of an original database process in the third node.

This embodiment of the present disclosure provides a first node, where the first node writes a transaction log to the first dual port SSD, so that in a case in which the first node crashes, the second node acquires the transaction log from the first dual port SSD, and the second node operates, according to the transaction log, data that is stored in the first node before the first node crashes; or the first node writes a transaction log to the first dual port SSD, so that in a case in which the first node crashes, after the second node acquires the transaction log from the first dual port SSD, the second node sends the transaction log to a third node, and the third node operates data that is stored in the first node before the first node crashes, where the third node, the first node, and the second node being capable of data transmission with each other, so that when the first node crashes, the second node or the third node can use a dual port SSD to read log information of the crashed node, and after performing recovery, replace the first node to provide a service externally, thereby improving a recovery speed of the cluster, and improving system availability.

The foregoing descriptions are merely exemplary and specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data management method for a database cluster comprising two or more dual port solid state disks (SSDs), three or more nodes and a shared storage, wherein each dual port SSD is connected to a unique pair of nodes and each node in the unique pair of nodes is connected to a unique pair of the dual port SSDs, the method comprises:
   acquiring, by the shared storage, a transaction log from at least one of the nodes;
   acquiring, by each of the dual port SSDs, a transaction log from a first node of the unique pair of nodes connected to the dual port SSD, wherein the transaction log stores data generated by a first database process at the first node after a checkpoint; and
   sending, by each of the dual port SSDs, the transaction log to a second node of the unique pair of nodes when the first node crashes, wherein the second node
   a) operates a database process according to data obtained from the transaction log, wherein the obtained data is data stored in the first node before the first node crashes and the database process is the same as the first database process, or
   b) directly sends the transaction log to a third node that operates the database process instead of the second node.

2. The method according to claim 1, wherein the first node acquires in a preset period, the transaction log that includes data collected after the checkpoint of the dual port SSD, and archiving, by the first node, into a shared disk array, the transaction log that is after the checkpoint.

3. The method according to claim 1, wherein both the first node and the second node are database instances.

4. The method according to claim 3, wherein at least one port in the first dual port SSD is a PCIE port; and at least one port in the second dual port SSD is a PCIE port.

5. The method according to claim 1, wherein the database process at the second node is independent of an original database process in the second node.

6. The method according to claim 1, wherein the database process at the third node is independent of an original database process in the third node.

7. A database cluster comprising two or more dual port solid state disks (SSDs), three or more nodes and a shared storage, wherein each dual port SSD is connected to a unique pair of nodes, each node in the unique pair of nodes is connected to a unique pair of the dual port SSDs, and each node comprises:
  a processor, a communications interface, and a memory capable of mutual communication via a bus, wherein the processor is configured to run executable program code stored in the memory, to:
    acquire a transaction log from a first node of the unique pair of nodes connected to the dual port SSD, wherein the transaction log stores data generated by a first database process at the first node after a checkpoint;
    sending the transaction log to a second of the unique pair of nodes when the first node crashes, wherein the second node
      a) operates a database process according to data obtained from the transaction log, wherein the obtained data is data stored in the first node before the first node crashes and the database process is the same as the first database process, or
      b) directly sends the transaction log to a third node that operates the database process instead of the second node.

8. The database cluster according to claim 7, wherein the transaction log includes data collected by the first node after a checkpoint of the dual port SSD; and the first node archives, into a shared disk array, the transaction log that is after the checkpoint.

9. The database cluster according to claim 7, wherein both the first node and the second node are database instances.

10. The database cluster according to claim 9, wherein at least one port in the first dual port SSD is a PCIE port; and at least one port in the second dual port SSD is a PCIE port.

11. The database cluster according to claim 7, wherein the database process at the second node is independent of an original database process in the second node.

12. The database cluster according to claim 7, wherein the database process at the second node is independent of an original database process in the third node.

13. A data management system comprising:
  two or more dual port solid state disks (SSDs), three or more nodes and a shared storage, wherein each dual port SSD is connected to a unique pair of nodes, each node in the unique pair of nodes is connected to a unique pair of the dual port SSDs and each of the dual port SSDs is configured to
    acquire a transaction log from a first node of the unique pair of nodes connected to the dual port SSD, wherein the transaction log stores data generated by a first database process at the first node after a checkpoint; and
    send the transaction log to a second node of the unique pair of nodes when the first node crashes, wherein the second node
      a) operates a database process according to data obtained from the transaction log, wherein the obtained data is data stored in the first node before the first node crashes and the database process is the same as the first database process, or
      b) directly sends the transaction log to a third node that operates the database process instead of the second node.

14. The system according to claim 13, wherein the transaction log collects data after a checkpoint of one of the dual port SSDs; and the transaction log is archived into a shared disk array after the checkpoint.

15. The system according to claim 13, wherein both the first node and the second node are database instances.

16. The system according to claim 15, wherein at least one port in the first dual port SSD is a PCIE port; and at least one port in the second dual port SSD is a PCIE port.

17. The system according to claim 13, wherein the database process at the second node is independent of an original database process in the second node.

18. The system according to claim 13, wherein the database process at the second node is independent of an original database process in the third node.

* * * * *